April 5, 1932.  A. L. RAVEN  1,852,858
MOTION PICTURE SCREEN
Filed Aug. 9, 1930  2 Sheets-Sheet 1
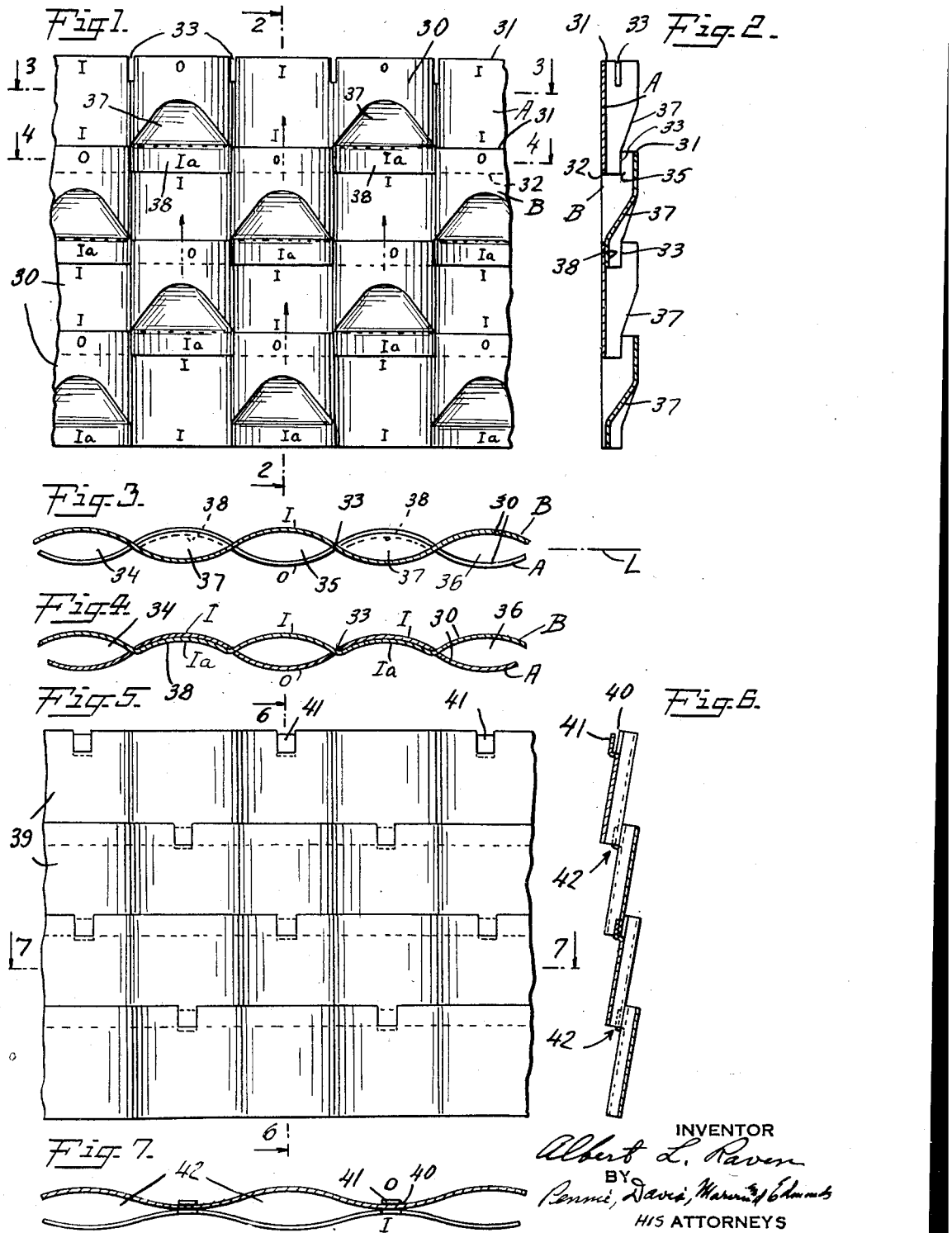
INVENTOR
Albert L. Raven
BY
HIS ATTORNEYS April 5, 1932.    A. L. RAVEN    1,852,858
MOTION PICTURE SCREEN
Filed Aug. 9, 1930    2 Sheets-Sheet 2
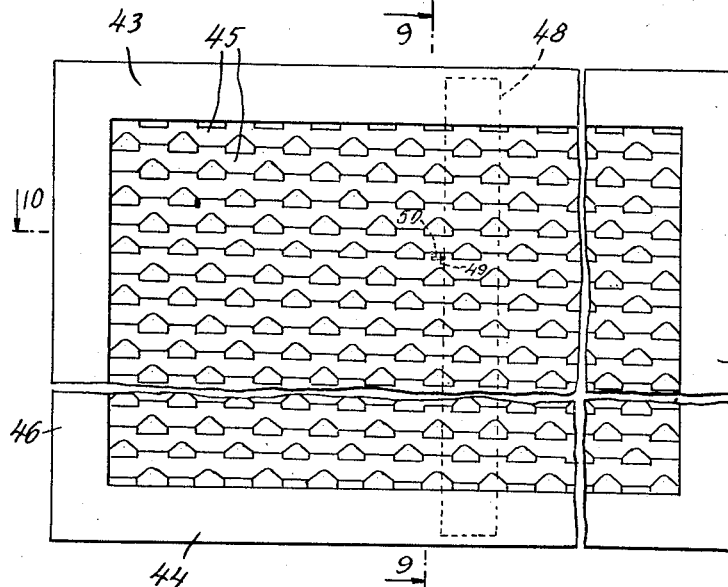
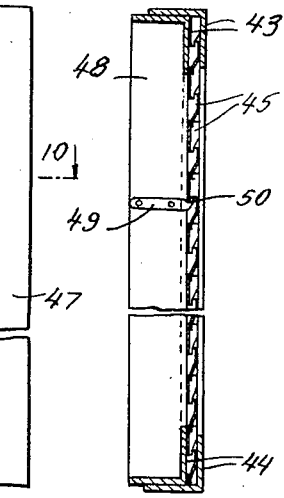
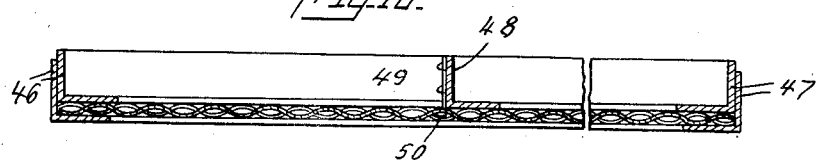
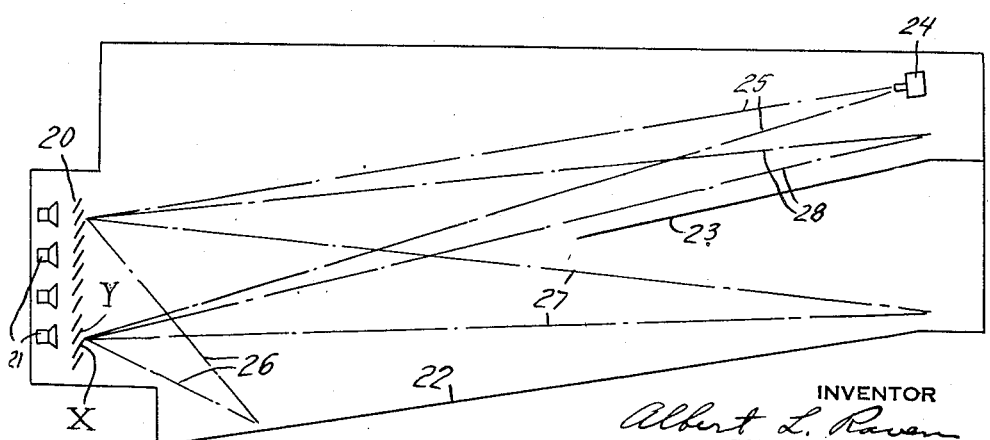
INVENTOR
Albert L. Raven
BY
Pennie, Davis, Marvin and Edmonds
HIS ATTORNEYS Patented Apr. 5, 1932

1,852,858

UNITED STATES PATENT OFFICE

ALBERT L. RAVEN, OF MOUNT VERNON, NEW YORK

MOTION PICTURE SCREEN

Application filed August 9, 1930. Serial No. 474,123.

The present invention relates to picture screens intended for the showing of pictures accompanied by sound.

In order to properly show pictures accompanied by sound, and particularly talking motion pictures, it has been found necessary to have the sound transmitted through the picture screen itself, rather than by placing the loud speakers around the edges of the screen. By placing the loud speakers directly behind the screen and providing a properly constructed screen, the sound, for example the voices of the actors in a talking motion picture, appears to proceed more nearly from the mouth of the person speaking. This is of particular importance with the advent of pictures which are shown on extremely large sized screens.

The proper construction of such a screen presents a number of problems. Both the proper reflection of the picture projected upon the screen must be provided for, and the screen should be so made that the sound will readily pass through it without being muffled or modified so as to change undesirably the character of the sound, whether speech or music. The screen must function efficiently in both of these ways so that the transmission of the sound will not affect the reflection of the picture, and vice versa. In other words, the sound openings through the screen must be invisible to the audience, and the screen must be so constructed that these openings will not cast shadows which will be visible to the audience.

It is important, furthermore, that the screen be easy to support in the theatre in a single plane without wrinkling, that it be fireproof, and be so constructed that it will collect as little dust as possible, and be susceptible of being cleaned easily from time to time.

Other important considerations are that the screen be capable of manufacture simply and economically, and constructed in such a way that it can be shipped without difficulty to the place of installation, and then be readily installed in the theatre.

The object of the present invention is to provide a screen which possesses these as well as other advantages, and in order that the invention may be clearly understood, attention is directed to the following description together with the accompanying drawings showing two embodiments of the invention. It will be understood that this constitutes merely an exemplifying disclosure, however, and that the construction of the screen may be varied from the examples given without departing from the invention which is defined in the appended claims.

In these drawings:

Fig. 1 is a front elevation of a small section of one embodiment of my improved screen.

Fig. 2 is a vertical section taken on line 2—2 of Fig. 1.

Fig. 3 is a horizontal section taken on line 3—3 of Fig. 1.

Fig. 4 is a horizontal section taken on line 4—4 of Fig. 1.

Fig. 5 is a view similar to Fig. 1 of a modified form of screen.

Fig. 6 is a vertical section taken on line 6—6 of Fig. 5.

Fig. 7 is a horizontal section taken on line 7—7 of Fig. 5.

Fig. 8 is a front elevation illustrative either of a complete screen or a section or panel of a screen mounted in a frame as installed in a theatre.

Fig. 9 is a vertical section taken on line 9—9 of Fig. 8.

Fig 10 is a horizontal section taken on line 10—10 of Fig. 8; and

Fig. 11 is a diagrammatic vertical section of a theatre auditorium.

Referring first to Fig. 11, the sound screen 20 is appropriately hung at the front of the auditorium with preferably a plurality of loud speakers 21 arranged behind it. The orchestra floor is indicated at 22, the balcony floor at 23 and the projector at 24. The broken lines 25 indicate the boundary rays from the projector. The broken lines 26 indicate the boundary rays coming from the upper and lower edges of the picture respectively to a person situated in the front row of the orchestra. Lines 27 indicate the boundary rays coming to a person at the rear of the orchestra, and lines 28 the boundary rays coming to a person in the balcony.

My improved sound screen is constructed of elements 30 or their equivalent arranged to overlap one another in such a way as to prevent light from passing through the screen and also to prevent any person in the audience from being able to see through the screen, or to see shadows cast by the overlapping elements. The edges of the elements extend generally in a horizontal direction across the face of the screen. The extent of the overlap must be sufficient to prevent the lower boundary ray 25 from the projector from passing through the screen, and also to prevent an observer in the balcony from being able to see through the screen along the lower boundary ray 28.

The elements are overlapped so that the apertures between them pass upwardly from the rear toward the front of the screen, and hence the shadows cast by the individual elements will be invisible to the spectators. Considering, for example, any two individual elements X and Y, the shadow cast by the upper edge of element X will fall on element Y at a point below the upper edge of element X. Hence it is invisible to any observer positioned below the lower boundary ray 25 from the projector. Moreover, the hazy or dusty effect produced in screens having visible sound holes passing through them is avoided.

Considering now Figs. 1 to 4 inclusive of the accompanying drawings, the sound screen here shown consists of an assemblage of corrugated strips 30 arranged horizontally across the screen. The upper and lower edges 31 and 32 respectively of these strips, when viewed from the front, are parallel straight lines. The upper approximate half portions of these strips are uniformly corrugated to present the wavy formation readily seen in Fig. 3, and having alternating outward and inward crests indicated respectively by the letters O and I.

The strips are preferably made of thin gauge metal such for example as aluminum, copper, brass, steel, or a suitable metal alloy. They may also be made of molded material or of vulcanized fibre or the like.

The lower approximate half portions of the corrugated strips 30, however, are not uniformly corrugated as just described, but the lower portions of each of the outward crests O are forced inwardly forming depressions $I_a$, the purpose of which will presently appear.

One of the edges, for example the upper edge 31 of each of the strips 30, is provided with spaced slots 33 slightly wider than the thickness or gage of the material from which the strips are made, and located midway between the crests O and I, and since the change in curvature between these crests is uniform, these slots are located midway between the peaks of these crests as may be seen in Fig. 2.

The opposite edge 32 of each of the strips 30 is preferably unslotted, and in assembling the strips to form the screen, the unslotted edge of one strip is inserted into the slots 33 of the next or adjacent strip with the result that the edges 31 and 32 overlap one another as shown in Figs. 1 and 2.

The slots 33 being located substantially on the centre line L of the corrugations (see Fig. 3), when each pair of adjacent strips are interlocked with each other as just described, the wavy formations or corrugations will cross each other symmetrically as shown in Fig. 3 and form oblong apertures between the overlapping walls of the interlocked strips.

Designating the uppermost pair of strips of Fig. 1 as A and B respectively, the interlocking or letting in of the lower edge of strip A into the upper slotted edge of strip B will produce the oblong sound apertures 34, 35 and 36 (see Figs. 3, 4 and 2). Referring to Fig. 2, these apertures extend upwardly past the lower edge 32 of strip A between the overlapping portions of strips A and B, and over the upper edge 31 of strip B. The extent of the overlap of the two strips not being very large, these passageways are oblique channels passing upwardly from the rear toward the front of the screen. The edges 31 will therefore cast their shadows against the rear surface of the apertures 35 where they are invisible to the audience.

It will be observed that apertures 34, 35 and 36 are formed by alternating interlocking corrugations. The apertures which otherwise would be formed by the interlocking corrugations intermediate apertures 34, 35 and 36 are closed by the depressing of the lower portions of the outward corrugations of each strip referred to above and indicated at $I_a$. The depressions $I_a$ each comprise a sloping wall 37 and a reversely corrugated portion 38 which lies in contact with the outer surface of the inward corrugations I. The angle of the sloping portion 37 is such that no shadow is cast by depressions $I_a$, and the sloping surfaces 37 aid in deflecting the sound obliquely as it strikes the rear of the screen through the sound passages 34, 35 and 36, and away from the forward surface of the screen.

Referring now to the modified form of screen shown in Figs. 5, 6 and 7, the strips 39 are corrugated in a similar manner to strips 30. Their manner of assembly however, is slightly different resulting in an enlargement of the sound passages. The slots 40 which correspond to slots 33, are spaced along one edge of the strip like slots 33, but slots 40 occur at the peaks of the outward corrugations or crests O (see Fig. 7). These slots, moreover, are formed by a lip 41 which is bent rearwardly and then upwardly as shown in Fig. 6, forming with the surface of the strip a lip of about the same width as the thickness of the strip adapted to receive the edge of an adjacent strip so as to place the two strips in overlapping relation as before.

The overlapping relation of the strips is shown clearly in the sectional view of Fig. 6, and in assembling the strips the peaks of the corrugations are brought into contact with one another forming large oblong sound passages 42 which are approximately twice the size of the sound passages 34, 35 and 36 for the same spacing between the corrugations. In this manner of assembling the corrugated strips, the vertical surface of each strip is at a slight angle to the plane of the screen instead of being parallel therewith as in the screen shown in Fig. 1. The sound passages 42 pass obliquely through the screen upwardly from the rear toward the front thereof. As in the case of the screen of Fig. 1, no shadows visible to the audience can be cast by the upper edges of the corrugated strips.

One of the important features of the screen of my present invention is in the simplicity of holding the corrugated strips together to form a screen. On account of the interlocking of the strips with one another by letting the edge of each strip into the slots in an adjacent strip, a considerable amount of rigidity in the vertical direction is imparted to the assemblage of strips, each individual strip being substantially rigid in this direction because of its corrugation. Consequently to hold the strips in the form of a screen, it is only necessary to maintain the upper and lower edges straight and the uppermost and lowermost strips in fixed position, since if these two strips are held in position the remaining strips of the screen cannot get out of place.

This is accomplished, as shown in Figs. 8, 9 and 10, by means of two pairs of horizontal bars 43 and 44, which are clamped to the uppermost and lowermost rows, respectively, of the screen strips 45. These bars may be held in spaced parallel relation in any convenient manner. As shown, they are joined at their ends by pairs of uprights 46 and 47, and these uprights may also be made to clamp the vertical edges of the screen if desired, although this is not necessary. Other structures for providing a rigid support along the upper and lower edges of the screen may be used, the important thing being to maintain these edges straight. Also other means may be provided for maintaining these bars in spaced parallel relation.

It will be understood that the means of supporting the screen strips just described may be employed for the entire screen, or this construction may be followed in making up horizontal or vertical panels of convenient width. These panels can then be conveniently crated and shipped, and readily assembled to form a complete screen of any desired size by bolting or clamping together the horizontal bars along the upper and lower edges of neighboring panels. In constructing screens made up of panels in this way, the outer or vertical portions of bars 43 and 44 are omitted, and the screen strips are secured to the edges of the inner or horizontal portions of bars 43 and 44 in any convenient manner, as for example by welding, brazing, riveting, etc. In this way the panels may be joined together so that the joints between them will be invisible in the front of the screen.

In some cases it is desirable to provide means for steadying the body of the screen so as to prevent it from bulging either inwardly or outwardly and maintain it in a single plane, and also to keep the screen strips from spreading after the screen is hung. For this purpose a plurality of vertical bars 48 may be secured to the rear pairs of bars 43 and 44 in such a way that their front edges will bear against the rear surface of the screen. These bars will prevent the screen from bulging rearwardly. In order to keep the body of the screen from bulging outwardly, anchors 49 are secured in spaced relation along the upright bars 48. These anchors 49 have upwardly turned hooked ends 50 which enter the sound passages through the screen and, by engaging the front surface of the strip, draw the screen against the vertical bars 48.

Instead of securing the corrugated strips together as above described, they may be assembled with the edges of each strip inserted in the slot of the next strip, and then the individual strips may be secured to their neighbors by means of soldering, welding, or riveting. A screen made in this way may be hung in the theatre as a single sheet. It is, however, desirable to provide a rigid bar along the upper and lower edges, respectively, in order to hold the screen flat.

The screen may be shipped in strip form and assembled at the place of installation. Ordinarily, however, the screen is made in panels, for example, of from 24 to 36 inches in width, a number of these panels being packed in the same container, and assembled at the destination. When the elements of the screen are secured together by soldering or welding, it may be rolled into a packet of a comparatively few inches inside diameter because, although the screen is rigid in the direction of the corrugations, it is relatively flexible in the direction at right angles to the corrugations. Such a rolled screen is readily packed for shipment.

The corrugations in the strip are comparatively shallow in depth as indicated in Figs. 3 and 4 so as to avoid distortion of parts of the projected picture as might occur with deeply corrugated strips which would bring the angle of the walls of the corrugations considerably out of the plane of projection, which should be as nearly as possible normal horizontally to the axis of projection.

The screen may be coated with any light reflecting material desired, such, for example, as paint, lacquer or enamel. In narrow theatres, moreover, where the picture is used within a small angle horizontally from the line of projection, a specular coating may be added, if desired.

For wide theatres, however, where it is of importance that the picture be as bright as possible at wide angles horizontally from the axis of projection, the light reflecting coating should have a fine grained surface which will appropriately diffuse the light, and help to spread the light over a wide area.

A picture projected upon my improved screen appears to be projected upon a continuous unbroken flat surface similar to the screens now used for non-sound pictures. No visible shadows are cast by the edges of the sound apertures, and the corrugations in the strip are not noticeable. The area of the sound openings provided is more than ample for the transmission of the sound without distortion. The screen is a solid compact mass with no small elements which can readily be set in vibration sympathetically by the sound, or by mechanical means. The screen can be readily cleaned by means of an air blast, or by washing.

In the accompanying drawings the strips have been illustrated on a somewhat enlarged scale, in order to show the construction clearly.

I claim:

1. A screen for the projection of pictures accompanied by sound comprising a plurality of horizontal corrugated strips each having the edge of an adjacent strip let into one of its edges, the outward and inward corrugations of adjacent strips cooperating with each other to form sound passages through the screen.

2. A screen for the projection of pictures accompanied by sound comprising a plurality of horizontal corrugated strips each having slots spaced along one edge thereof, an edge of an adjacent strip being inserted in said slots thus holding the outward and inward corrugations of adjacent strips in registry so as to produce sound passages through the screen.

3. A screen for the projection of pictures accompanied by sound comprising an assemblage of horizontal corrugated strips, each having slots spaced along one edge thereof and an edge of an adjacent strip inserted in said slots thus preventing lateral movement of the strips and holding the outward and inward corrugations of adjacent strips in registry so as to produce sound passages through the screen, and means for preventing the displacement of the uppermost and lowermost strips of said assemblage thereby maintaining the entire assemblage in operative position.

4. A screen for the projection of pictures accompanied by sound comprising an assemblage of horizontal corrugated strips, each having slots spaced along one edge and an edge of an adjacent strip inserted in said slots thus preventing lateral movement of the strips and holding the outward and inward corrugations of adjacent strips in registry so as to produce sound passages through the screen, the vertical surfaces of said strips being parallel with the plane of the screen, and means for preventing the displacement of the uppermost and lowermost strips of said assemblage thereby maintaining the entire assemblage in operative position.

5. A screen for the projection of pictures accompanied by sound comprising a plurality of horizontal corrugated strips, each having slots spaced along one edge thereof, an edge of an adjacent strip being inserted in said slots thus holding the corrugations of said strips in registry, the lower portions of the outward corrugations of said strips being pressed inwardly against the inner corrugations of the next lower strip so as to prevent the casting of shadows thereby, the upper portions of said outward corrugations cooperating with the lower portions of the inward corrugations to form sound passages extending upwardly from the rear to the front face of the screen.

6. A screen for the projection of pictures accompanied by sound comprising a plurality of horizontal corrugated strips, each having slots along one edge thereof near the peaks of alternating corrugations, an edge of an adjacent strip being inserted in said slots near the peaks of the corrugations of said strip, thus placing said strip in overlapping relation with the corrugations thereof cooperating to form sound passages passing upwardly from the rear to the front face of the screen.

7. A screen for the projection of pictures accompanied by sound comprising a plurality of horizontal corrugated strips, each having slots spaced along one edge thereof, an edge of an adjacent strip being inserted in said slots thus holding the corrugations of said strips in registry, the lower portions of the outward corrugations of said strips being pressed inwardly against the inner corrugations of the next lower strip so as to prevent the casting of shadows thereby, the upper portions of said outward corrugations cooperating with the lower portions of the inward corrugations to form sound passages extending upwardly from the rear to the front face of the screen, a pair of rigid bars secured along the upper and lower edges of said screen respectively, and means for maintaining said bars in fixed spaced relation.

8. A screen for the projection of pictures accompanied by sound comprising a plurality of horizontal corrugated strips, each having slots spaced along one edge thereof, an edge of an adjacent strip being inserted in said slots thus holding the corrugations of said strips in registry, the lower portions of the outward corrugations of said strips being pressed inwardly against the inner corrugations of the next lower strip so as to prevent the casting of shadows thereby, the upper portions of said outward corrugations cooperating with the lower portions of the inward corrugations to form sound passages extending upwardly from the rear to the front face of the screen, means for supporting said screen by the margins thereof, and means for steadying the body of said screen comprising spaced rests bearing against the rear of said screen and having hooks thereon for engaging the front of said strips through the sound apertures therein.

In testimony whereof I affix my signature.

ALBERT L. RAVEN.